Figure 1:
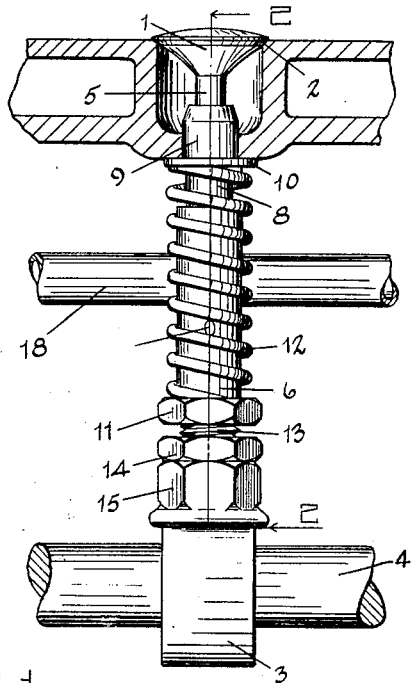

May 29, 1928.

I. B. HAYES ET AL 1,671,111

VALVE MECHANISM

Filed April 13, 1927

Inventor
Irwin B. Hayes and
Matt Burke
By Faust F. Crampton
Attorney

Patented May 29, 1928.

1,671,111

UNITED STATES PATENT OFFICE.

IRWIN B. HAYES AND MATT BURKE, OF TOLEDO, OHIO.

VALVE MECHANISM.

Application filed April 13, 1927. Serial No. 183,289.

Our invention has for its object to provide a valve mechanism of equal or greater efficiency than those of various types used at present at a much lower cost of production, to simplify the construction of valve mechanisms by reducing the number of parts, and to reduce the labor necessary to install the operating parts of these mechanisms.

At present, the valves and the component parts used vary in construction though they are located in relatively the same position and perform the same function in the engine. In construction, the tappets, push rods, and rocker arms of the overhead motor or valve-in-head motor have more operating parts than the tappets and valves used in the type known as the T- or L-shaped motor. However, the tappets and valves in each of these types of motors become loose and noisy with use and the resulting disturbances are not desirable in engines, particularly those in automobiles. The cost of production of the various parts adds to the cost of the motor though the desirable condition for the engine has not been obtained in continuous use. By our invention the operation of the parts is united and they continuously operate quietly without developing any looseness. The stem of the valve is secured in a cylindrical member which has a cap threaded on its lower end. The cap rides directly upon the surface of the cam and communicates the cam action to the valve head. A cylindrical member, smaller in diameter than the one secured to the stem, is located on the stem between the stem and the outer cylindrical member. These members slide within each other and have flange portions and a coil spring is located around the outer member, its ends being pressed against the flanges to provide for the return of the valve and produce a relatively free resilient action between the moving parts and also for the riding of the cap on the surface of the cam.

Thus we have provided a valve mechanism which is simple in construction and to mount on the motor. The mechanism is of such construction that it can be easily placed in any position required in an engine. In overhead type motors, the cam shaft would be located directly over the valves and their movement would be, as usual, downward, but by the use of the mechanism, the number of parts would be greatly reduced in comparison to those now necessary or those which would be necessary to add. In motors which are T-shaped or L-shaped the valve mechanism could be adopted with only minor changes to those which are found in types now used.

The invention may be contained in mechanisms which may vary in construction and, to illustrate a practical application of our invention, we have selected a valve mechanism containing the invention and shall describe it hereinafter. The mechanism selected as an example is shown in the accompanying drawings.

Figure 2:
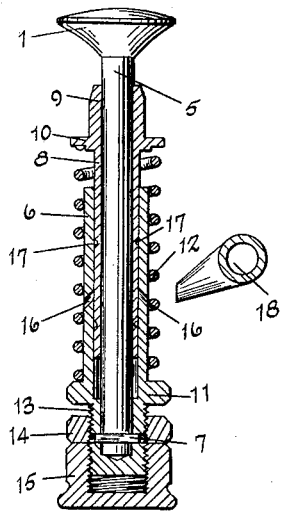

Fig. 1 of the drawings is a side elevation of the valve mechanism and its position between the cam shaft of the motor block. Fig. 2 is a section taken on the plane of the line 2—2 indicated in Fig. 1 and shows the construction of the mechanism.

The head of the valve 1 is seated in the ports 2 which are in the face of the engine block in a manner well-known in the art and it is operated by the action of the cam 3 on the cam shaft 4. The stem 5 of the valve 1 extends through the port chambers, and is secured to the cylindrical shell 6 by the pin 7. A second cylindrical shell 8 is located between the stem 5 and the shell 6 and has a head 9 which extends into the bottom of the port chamber. The head is provided with a protruding edge or flange 10 that presses against the outer surface of the block. The shell 6 is provided with a flange 11 and extending between the flanges 10 and 11 is the coil compression spring 12 which forces the flanges away from each other. Thus the head of the valve is held securely against the port opening by the expansion of the spring which forces the shell member 6 downward and the shell 8 upward. The stem 5 operates through the interior of the shell 8 and the shell 6 slides on the outer surfaces of the shell 8, the telescoping shells and valve stem fitting snugly which prevents any tendency of the valve stem to become loose or wobbly.

To actuate the valve, a cap 15 is threaded on to the end of the shell 6 as at 13, adjustably secured in position by the lock nut 14. The cap 15 rides on the surface of the cam 3. The length of the rise of the valve head may be adjusted by rotating the cap 15 on the threaded portion. The lock nut 14 locks the cap in a definite position according to the pre-determined length of the valve operation. Thus the cap is secured to the shell 6 to cause a direct movement of the valve without carrying the action through a number of separate parts.

To provide ample lubrication for the moving parts, we have provided the oil holes 16 in the shell 6 and the circular grooves 17 in the shell 8. The oil is forced by the oil pump of the motor through the pipe 18 which discharges the oil in the vicinity of the hole 16 and over the exterior of the mechanism, and works into the interior of the inner shell onto the surface of the stem. This arrangement provides a good bearing surface for the stem of the valve and an efficient means for maintaining the lubrication of the stem.

We claim:

In a valve mechanism for internal combustion engines, a valve, the valve having a stem, a sleeve surrounding the stem and having a flange, a part of the sleeve located on one side of the flange fitting the wall of the engine, the flange forming a stop that is pressed against the wall of the engine in locating the valve mechanism in position in the engine, a second sleeve surrounding the first named sleeve and having a flange, a spring located intermediate the flanges, the second sleeve having a threaded end part, a pin for connecting the end of the stem with said end of the second sleeve, a cam block threaded on to the said end of the second sleeve for adjustably locating the valve relative to the cam shaft of the engine, and means for locking the block in its adjusted position.

In witness whereof, we have hereunto signed our names to this specification.

IRWIN B. HAYES.
MATT BURKE.